United States Patent
Mokhtari et al.

(10) Patent No.: US 10,243,363 B2
(45) Date of Patent: Mar. 26, 2019

(54) SYSTEMS AND METHODS FOR LOCAL DEMAND OPTIMIZATION

(71) Applicant: Open Access Technology International, Inc., Minneapolis, MN (US)

(72) Inventors: Sasan Mokhtari, Eden Prairie, MN (US); Khashayar Nodehi Fard Haghighi, Maple Grove, MN (US); Erik Alan Amundson, Rogers, MN (US); David Heim, Minneapolis, MN (US); Dean Eriksson, Brooklyn Park, MN (US); Anthony Charles Sorvari, Shoreview, MN (US)

(73) Assignee: Open Access Technology International, Inc., Minneapolis, MN (US)

( * ) Notice: Subject to any disclaimer, the term of this patent is extended or adjusted under 35 U.S.C. 154(b) by 189 days.

(21) Appl. No.: 15/073,132

(22) Filed: Mar. 17, 2016

(65) Prior Publication Data
US 2016/0276833 A1    Sep. 22, 2016

Related U.S. Application Data

(60) Provisional application No. 62/134,208, filed on Mar. 17, 2015.

(51) Int. Cl.
*G05B 15/02* (2006.01)
*H02J 3/14* (2006.01)
(Continued)

(52) U.S. Cl.
CPC ............ *H02J 3/14* (2013.01); *G05B 15/02* (2013.01); *H02J 3/383* (2013.01); *H02J 13/0017* (2013.01); *H04L 12/2816* (2013.01); *H04L 12/2834* (2013.01); *H04L 12/66* (2013.01); *H02J 2003/003* (2013.01); *H02J 2003/143* (2013.01); *H04L 2012/4026* (2013.01); *H04L 2012/40215* (2013.01); *Y02B 70/325* (2013.01); *Y02B 90/2607* (2013.01); *Y04S 20/228* (2013.01); *Y04S 40/12* (2013.01)

(58) Field of Classification Search
CPC ............... G05B 15/02; H02J 13/0017; H02J 2003/003; H02J 3/14; H04L 12/2803; H04L 12/66
USPC .................................... 700/286, 291
See application file for complete search history.

(56) References Cited

U.S. PATENT DOCUMENTS 6,775,594 B1    8/2004  Conigliaro et al.
6,940,735 B2 *  9/2005  Deng ................ H02M 5/4585
                                                    290/46

(Continued)

FOREIGN PATENT DOCUMENTS

WO    2013/049547 A2    4/2013

*Primary Examiner* — Chun Cao
(74) *Attorney, Agent, or Firm* — Vidas Arrett & Steinkraus P.A.

(57) ABSTRACT

Systems and methods are provided, which provide for the de-centralization of the logic necessary to perform electrical optimization of any contained electrical system. The systems and methods de-centralize, or distribute, electrical optimization logic into intelligent devices which are locally connected to both the generation and loads, in such a way that control can be asserted over these resources. The inventive systems and methods require less infrastructure and communication backbone to IT/Data Center infrastructure than are typically required by previous systems and methods known in the art.

30 Claims, 3 Drawing Sheets

(51) Int. Cl.
    *H04L 12/66*     (2006.01)
    *H02J 13/00*     (2006.01)
    *H02J 3/38*     (2006.01)
    *H04L 12/28*     (2006.01)
    *H02J 3/00*     (2006.01)
    *H04L 12/40*     (2006.01)

(56) References Cited

U.S. PATENT DOCUMENTS

| | | | |
|---|---|---|---|
| 7,343,226 B2 * | 3/2008 | Ehlers | G06Q 10/10 700/276 |
| 2003/0009301 A1 * | 1/2003 | Anand | G01D 4/004 702/62 |
| 2004/0095237 A1 * | 5/2004 | Chen | G06F 11/0748 340/506 |
| 2010/0187820 A1 | 7/2010 | Wakasa et al. | |
| 2010/0217550 A1 * | 8/2010 | Crabtree | H02J 3/005 702/62 |
| 2011/0106327 A1 | 5/2011 | Zhou et al. | |
| 2011/0196546 A1 | 8/2011 | Muller et al. | |
| 2012/0221163 A1 | 8/2012 | Forbes, Jr. | |
| 2012/0265355 A1 | 10/2012 | Bernheim et al. | |
| 2013/0166081 A1 | 6/2013 | Sanders et al. | |
| 2013/0211555 A1 | 8/2013 | Lawson et al. | |
| 2013/0285453 A1 | 10/2013 | Hurst et al. | |
| 2013/0289782 A1 | 10/2013 | Giroti | |
| 2016/0011577 A1 * | 1/2016 | Schwarz | G05B 15/02 700/295 |

\* cited by examiner

SYSTEMS AND METHODS FOR LOCAL DEMAND OPTIMIZATION

CROSS-REFERENCE TO RELATED APPLICATIONS

This application claims priority to U.S. Provisional patent application No. 62/134,208 filed Mar. 17, 2015, the entire content of which is hereby incorporated by reference.

STATEMENT REGARDING FEDERALLY SPONSORED RESEARCH

Not Applicable.

FIELD OF THE INVENTION

Statement Regarding Federally Sponsored Research

The present disclosure relates generally to electric power and, more particularly, to performing distributed processing via Intelligent Gateway, thus reducing grid stress and optimizing costs.

BACKGROUND OF THE INVENTION

Proliferation of renewable generation such as solar, wind, and energy storage systems and in general distributed energy resources have created new challenges for the distribution grid operations. The distribution grid circuits and its protection systems have been designed to serve customer load at the end of the distribution feeders. However the ever increasing expansion of distributed energy sources which feed power back to the distribution grid can result in voltage and power flow problems if their operations are not coordinated and managed. Managing millions of smart grid devices and distributed energy resource with previously known technologies would require a large communication infrastructure, massive data movement through the cloud, and massive computer processing.

BRIEF SUMMARY OF THE INVENTION

In general, this disclosure is directed toward local processing, optimization based local intelligence, and distributed processing. The improvement here is the ability to perform distributed processing via an Intelligent Gateway device. This relieves stress on the utility grid due to intermittency of renewable generation, and also optimize cost of power for the homeowner/facility owner.

The invented systems and methods leverage market operation experiences and utilize advances in information technology, optimization techniques, computation capabilities, and control algorithms. In some embodiments, the disclosure may support further evolution of electricity market policy, design, and deployment in a variety of market operation settings.

The architecture of the disclosed system and methodology can perform Demand Response (DR) and manage Distributed Energy Resources (DER) to provide optimization within programmable limits and thresholds.

Using demand side (DR-DER) capabilities to provide optimization is the key to a cost effective solution. The invention relies on little or no information from the outside world to conduct a strategy such as shifting the water heater load to a more opportune time when solar is available or use storage to discharge when solar has temporarily diminished or use prices to shift some of the load to off-peak periods.

The details of one or more aspects of the disclosure are set forth in the accompanying drawings and the description below. Other features, objects, and advantages will be apparent from the description, drawings and mathematical formulations that are summarized in the claims.

DETAILED DESCRIPTION OF THE INVENTION

Figure 1:
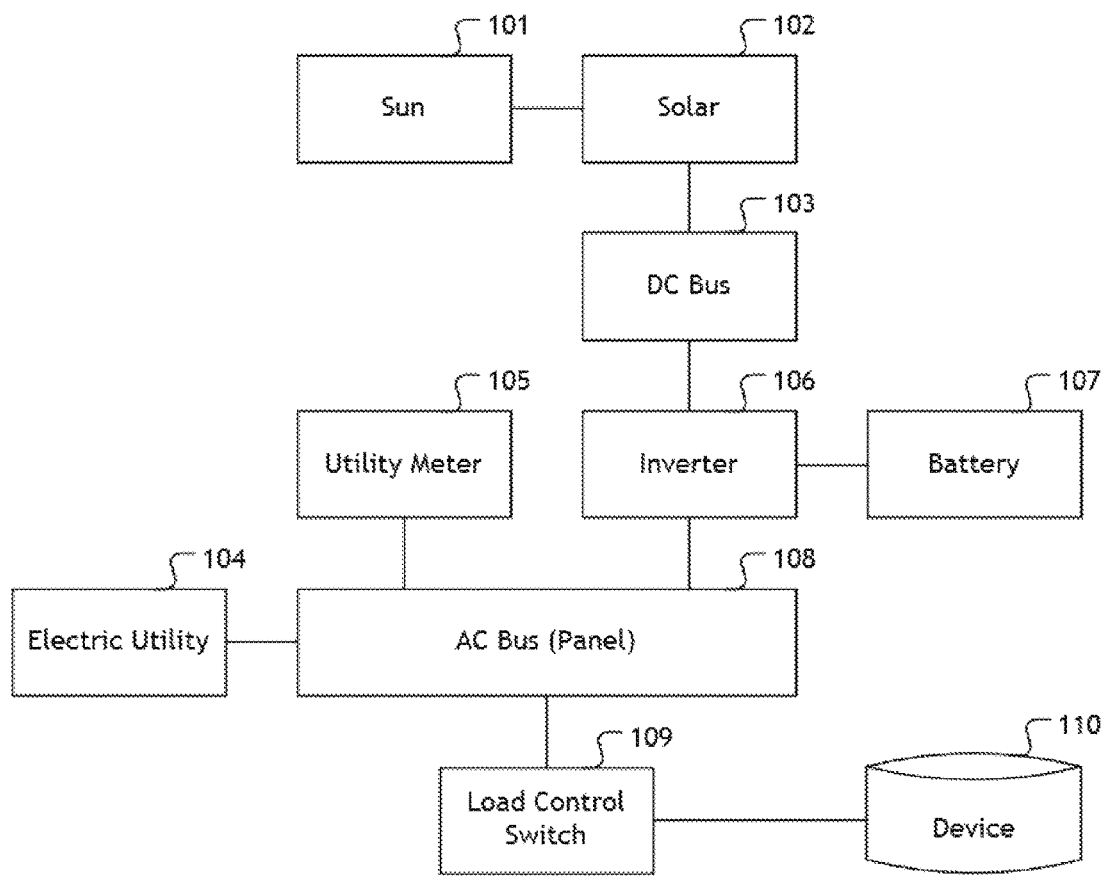
FIG. 1 is a diagram illustrating operation of the technology utilized in one embodiment of the designed system.
Figure 2:
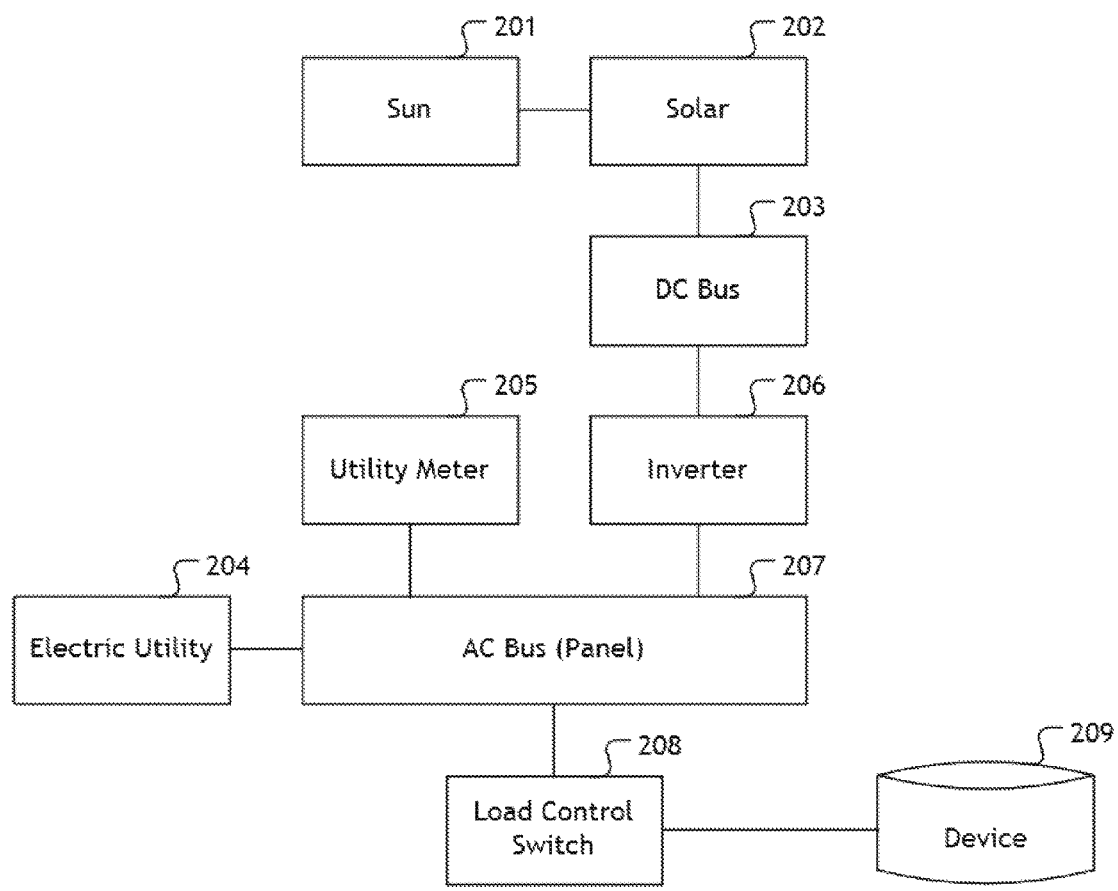
FIG. 2 is a diagram illustrating operation of the technology utilized in another embodiment of the designed system.
Figure 3:
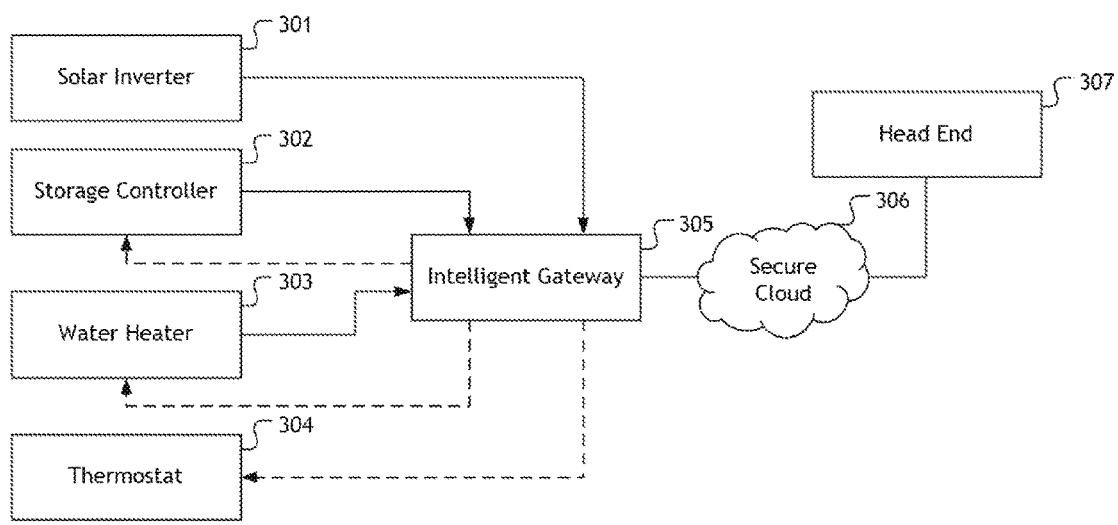
FIG. 3 is a diagram illustrating the flow of communication in preferred embodiments of the invention.

While this invention may be embodied in many forms, there are specific embodiments of the invention described in detail herein. This description is an exemplification of the principles of the invention and is not intended to limit the invention to the particular embodiments illustrated.

In general, this disclosure is directed toward electric power, distributed processing via an Intelligent Gateway device, a microgrid controller, or any other electronic computing device capable of logical computation "Intelligent Gateway" 305, and local demand optimization by shifting the energy consumption of the load of a residential device such as an electric water 110 heater to consume the energy from a residential solar generator 102 rather than the grid.

In one embodiment, the Intelligent Gateway 305 monitors generation from solar 102, state of charge of the battery 107, and consumption of power from loads. A Load Control Switch (LCS) 109 is connected to an electric water heater 110 or other such similar device known in the art. The LCS 109 can respond to control action by an Intelligent Gateway 305 via common home area network protocols or industrial control protocols such as, but not limited to Zigbee, WiFi, Ethernet, CANbus, Modbus, BACnet, DNP, and open or close the circuit that energizes the water heater 110. The Intelligent Gateway 305 is also connected to the Inverter 106 of the solar generator 102 via one of the home area network protocols. The Intelligent Gateway 305 monitors the solar generator 102 output at the AC Inverter bus 108. The LCS 109 can also sense the current draw or power consumption of the electric circuit of the water heater to establish if it is consuming energy.

The data points may also be collected internally by an integrated gateway device which controls all equipment involved. The data points may be collected very frequently (less than 1 second) from different energy consuming and energy producing equipment in the control of the Intelligent Gateway 305 to ensure fast response of the mechanism. The Intelligent Gateway 305 records a history of on-period and off-period durations. This self-learning technique allows the gateway 305 to determine based on historical patterns on average how long the water heater stays ON and how long it stays OFF whenever it switches to ON or OFF states. This process of continuous turning the water heater 110 on or off by learning from its historical behavior in response to availability of solar generation 102 or for that matter any other type of local generation such as a battery 107 will continue indefinitely as long as the alternative source of generation is available. The advantage of this local optimization is that it ensures to the extent possible the local generation is consumed locally avoiding injection to the grid and thus avoiding issues associated with that. For the consumer the advantage is reduced consumption and thus lower cost of energy.

Based on pre-defined energy saving strategies or on set points and/or forecasts, it makes local decisions to optimize the energy interchange with the utility. Set points and/or forecasts may be obtained via a cloud data connection 306 or locally learned via data points collected over a home area networking protocol. The Intelligent Gateway 305 obtains the local weather forecast and percentage of cloud coverage.

Decisions can include DR on the load (water heater or other such similar device known in the art), or charge or discharge of the DER assets (battery or other such similar device known in the art). Decisions can be enacted via home area networking protocols, or direct control via an integrated device. Decisions involving DER assets (batteries, generators, or other such similar devices known in the art) may be weighted for priority usage, contain reserve fuel or charge settings, or cost of operation restrictions.

When generation dips, optimization is performed within programmable limits and thresholds. Optimization logic may consist of "proportional-integral-derivative controller" (PID), or "proportional-integral controller" (PI), or if-then clause rules, or other optimization and control methods. Programmable limits and thresholds may be downloaded to the Intelligent Gateway 305 via cloud connection 306, allowing higher-level application logic to preset thresholds or enact set points or rules from user applications (i.e. mobile or web-based software).

Stepping on loads in the long-term (if renewable interruption lasts a long time) can be randomized or grouped in an enterprise system integration via cloud connection to gradually re-introduce loads onto the larger grid. If the cloud coverage for the next 15 to 30 minutes is high and instantaneously the solar generator is producing none or very small amounts of electricity then the Intelligent Gateway 305 will command the LCS 109 to open the circuit and prevent the water heater from consuming electricity. This open circuit condition will be sustained as long as the solar generation is depressed and as long as the water heater has not remained in OFF state too long beyond the OFF period threshold established in step (b) above. If the cloud cover lifts fully or partially and the solar generation instantaneously shows output power then the water heater can be turned on by the Intelligent Gateway 305 to take advantage of available electricity and thus reduce reliance on the grid. The timing of the steps and the grouping information may be configuration information pre-downloaded from the cloud connection. Using device default values or pre-configured information from a cloud connection, all of the optimization actions can happen without instructions from a larger, central system. Local logic can perform all of these functions, but can also be enhanced by enterprise system integration via cloud connection.

In another embodiment, the Intelligent Gateway 305 monitors generation and consumption of power from loads. The medium used to collect these data points can be Zigbee, WiFi, Ethernet, CANbus, Modbus, BACnet, DNP, or a mix of other home area networking protocols or industrial control protocols. A Load Control Switch 208 is connected to the electric water heater 209. The LCS 208 can open or close the electric circuit that energizes the water heater 209. The LCS 208 can respond to control action by an Intelligent Gateway 305 via common home area network protocols such as ZigBee, Z-Wave, Modbus, etc. and open or close the circuit that energizes the water heater 209. The LCS 208 can also sense the current draw or power consumption of the electric circuit of the water heater to establish if it is consuming energy.

The data points may also be collected internally by an integrated gateway device 305 which controls all equipment involved. The data points may be collected very frequently (less than 1 second) from different energy consuming and energy producing equipment in the control of the Intelligent Gateway 305 to ensure fast response of the mechanism. The Intelligent Gateway 305 records a history of on-period and off-period durations. This self-learning technique allows the gateway 305 to determine based on historical patterns on average how long the water heater stays ON and how long it stays OFF whenever it switches to ON or OFF states.

Based on pre-defined energy saving strategies or on set points and/or forecasts, it locally decides to perform DR in this 'contained' system to avoid unwanted in-rush of power on the larger grid overall. Set points and/or forecasts may be obtained via a cloud data connection 306 or locally via data points collected over a home area networking protocol. The Intelligent Gateway 305 obtains the local weather forecast and percentage of cloud coverage.

When generation dips, DR is performed on the loads. DR is performed within programmable limits and thresholds. DR rules may contain priorities, weights, if-then rules, manual overrides, or other attributes. Optimization logic may consist of "proportional-integral-derivative controller" (PID), or "proportional-integral controller" (PI), or if-then clause rules, or other optimization and control methods. Programmable limits and thresholds may be downloaded to the Intelligent Gateway 305 via cloud connection 306, allowing higher-level application logic to preset thresholds or enact set points or rules from user applications (i.e. mobile or web-based software).

Stepping on loads in the long-term (if renewable interruption lasts a long time) can be 'randomized' or 'grouped' in an enterprise system integration via cloud connection to gradually re-introduce loads onto the larger grid. If the cloud coverage for the next 15 to 30 minutes is high and instantaneously the solar generator is producing none or very small amounts of electricity then the Intelligent Gateway 305 will command the LCS 208 to open the circuit and prevent the water heater from consuming electricity. This open circuit condition will be sustained as long as the solar generation is depressed and as long as the water heater has not remained in OFF state too long beyond the OFF period threshold established in step (b) above. If the cloud cover lifts fully or partially and the solar generation instantaneously shows output power then the water heater can be turned on by the Intelligent Gateway 305 to take advantage of available electricity and thus reduce reliance on the grid. The timing of the 'steps' and the grouping information may be configuration information pre-downloaded from the cloud connection. Using device default values or pre-configured information from a cloud connection, all of the optimization actions can happen without instructions from a larger, central system. Local logic can perform all of these functions, but can also be enhanced by enterprise system integration via cloud connection.

The invention claimed is:

1. A method for Local Demand Optimization of electricity market systems, that supports intelligent devices which are locally connected to generation(s) and load(s) comprising the following steps:
   an Intelligent Gateway for monitoring and controlling equipment and devices;

generation from solar, status of storage, and power consumption from loads being monitored;
set points and/or forecasts for local decisions and optimization actions;
programmable limits and thresholds;
stepping on loads to gradually re-introduce them onto the larger grid; and
device default values or pre-configured information from a cloud connection allowing optimization actions to happen without instructions from a larger or centralized system.

2. The method of claim 1, further comprising a medium collecting data points very frequently (less than one second), wherein said medium can be, but is not limited to:
Zigbee;
WiFi;
Ethernet;
CANbus;
Modbus;
BACnet and
DNP.

3. The method of claim 1, further comprising a medium wherein an integrated device controls all equipment involved.

4. The method of claim 1, further comprising uploading data points to a cloud-based system for higher-level application integration such as, but not limited to mobile or web-based software.

5. The method of claim 1, further comprising cloud data connection or home area networking protocol wherein the set points and/or forecasts can be obtained.

6. The method of claim 1, further comprising DR/DER decisions.

7. The method of claim 1, further comprising enacted by protocol or direct control.

8. The method of claim 1, further comprising programmable limits and thresholds, wherein optimization actions are performed.

9. The method of claim 8, further utilizing a proportional-integral-derivative controller (PID).

10. The method of claim 8, further utilizing a proportional-integral controller (PID).

11. The method of claim 8, further utilizing if-then clause rules.

12. The method of claim 1, further comprising an enterprise system integration via cloud connection.

13. The method of claim 12, further utilizing download of programmable limits and thresholds.

14. The method of claim 12, further utilizing re-introduction of loads onto the larger grid.

15. The method of claim 12, wherein the cloud connection can enhance local logic.

16. A system comprising:
An Intelligent Gateway configured to:
monitoring and controlling equipment and devices;
monitoring generation from solar, status of storage, and power consumption from loads being monitored;
monitoring set points and/or forecasts for local decisions and optimization actions;
programmable limits and thresholds;
stepping on loads to gradually re-introduce them onto the larger grid; and
device default values or pre-configured information from a cloud connection allowing optimization actions to happen without instructions from a larger or centralized system.

17. The system of claim 16, wherein said medium can be, but is not limited to;
Zigbee;
WiFi;
Ethernet;
CANbus;
Modbus;
BACnet and
DNP.

18. The system of claim 16, further comprising a medium wherein an integrated device controls all equipment involved.

19. The system of claim 16, further comprising uploading data points to a cloud-based system for higher-level application integration such as, but not limited to mobile or web-based software.

20. The system of claim 16, further comprising cloud data connection or home area networking protocol wherein the set points and/or forecasts can be obtained.

21. The system of claim 16, further comprising DR/DER decisions.

22. The system of claim 16, further comprising enacted by protocol or direct control.

23. The system of claim 16, further comprising programmable limits and thresholds, wherein optimization actions are performed.

24. The method of claim 23, further utilizing a proportional-integral-derivative controller (PID).

25. The method of claim 23, further utilizing a proportional-integral controller (PID).

26. The method of claim 23, further utilizing if-then clause rules.

27. The system of claim 16, further comprising an enterprise system integration via cloud connection.

28. The method of claim 27, further utilizing download of programmable limits and thresholds.

29. The method of claim 27, further utilizing re-introduction of loads onto the larger grid.

30. The method of claim 27, wherein the cloud connection can enhance local logic.

* * * * *